US010889281B2

(12) United States Patent
Ahn (10) Patent No.: US 10,889,281 B2
(45) Date of Patent: Jan. 12, 2021

(54) BRAKE DEVICE FOR VEHICLE (71) Applicant: HYUNDAI MOBIS CO., LTD., Seoul (KR)

(72) Inventor: Sung Ki Ahn, Namyangju-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 47 days.

(21) Appl. No.: 16/355,230

(22) Filed: Mar. 15, 2019

(65) Prior Publication Data
US 2019/0283727 A1 Sep. 19, 2019

(30) Foreign Application Priority Data

Mar. 16, 2018 (KR) .................. 10-2018-0030755

(51) Int. Cl.
B60T 17/00 (2006.01)
B60T 13/66 (2006.01)
F16K 47/02 (2006.01)
B60T 13/68 (2006.01)
B60T 13/14 (2006.01)
B60T 7/04 (2006.01)
B60T 17/02 (2006.01)

(52) U.S. Cl.
CPC .............. B60T 17/00 (2013.01); B60T 7/042 (2013.01); B60T 13/146 (2013.01); B60T 13/662 (2013.01); B60T 13/686 (2013.01); B60T 17/02 (2013.01); F16K 47/023 (2013.01)

(58) Field of Classification Search
CPC ........ B60T 17/00; B60T 13/662; B60T 17/02; B60T 13/146

USPC .................................... 303/10, 119.2
See application file for complete search history.

(56) References Cited

U.S. PATENT DOCUMENTS 7,448,698 B2 * 11/2008 Koyama ................. B60T 8/368
                                                         303/10
8,622,486 B2 *  1/2014 Tandler .................. B60T 8/368
                                                         303/10
9,517,757 B2 * 12/2016 Schlitzkus ............. B60T 8/4872
2004/0090115 A1 *  5/2004 Inoue ..................... B60T 8/368
                                                        303/119.3

(Continued)

FOREIGN PATENT DOCUMENTS

KR   10-2011-0065845 A    6/2011

Primary Examiner — Thomas J Williams
Assistant Examiner — James K Hsiao
(74) Attorney, Agent, or Firm — Knobbe Martens Olson & Bear LLP (57) ABSTRACT A brake device for a vehicle may include: a housing block; a plurality of buildup valve mounting parts formed in the housing block and disposed in a first row region; a plurality of reduce valve mounting parts formed in the housing block, and disposed in a second row region formed under the buildup valve mounting parts; a wheel cylinder port formed in the housing block, disposed above the buildup valve mounting parts, and connected to a wheel cylinder; a master cylinder port formed in the housing block, disposed above the buildup valve mounting parts, and connected to a master cylinder; a pump port formed in the housing block, and disposed under the buildup valve mounting parts; and one or more damper units formed in the housing block, and disposed among the buildup valve mounting parts, the wheel cylinder port and the master cylinder port.

14 Claims, 6 Drawing Sheets (56) References Cited

U.S. PATENT DOCUMENTS

| | | | |
|---|---|---|---|
| 2004/0160120 A1* | 8/2004 | Weh | B60T 8/368 303/119.3 |
| 2005/0082910 A1* | 4/2005 | Otto | F15B 13/086 303/119.2 |
| 2006/0220768 A1* | 10/2006 | Iyatani | B60T 8/368 335/78 |
| 2007/0096553 A1* | 5/2007 | May | B60T 8/368 303/119.3 |
| 2007/0228820 A1* | 10/2007 | Nakamura | B60T 8/4031 303/119.3 |

* cited by examiner

FIG. 5B

BRAKE DEVICE FOR VEHICLE

CROSS-REFERENCES TO RELATED APPLICATIONS

The present application claims priority to Korean application number 10-2018-0030755, filed on Mar. 16, 2018, which is incorporated by reference in its entirety.

BACKGROUND OF THE INVENTION

The present invention relates to a brake device for a vehicle, and more particularly, to a brake device for a vehicle, which can make better use of a part mounting space, and attenuate a pulsation amplitude when oil is discharged from a pump.

In general, a brake device refers to a device for decelerating or stopping a vehicle. Typically, when a driver steps on a brake pedal, a master cylinder amplifies hydraulic pressure to supply oil to a wheel cylinder which provides a braking force to each wheel. When a motor pump is driven as pressure of the brake pedal is sensed, the hydraulic pressure may be amplified and transferred to the wheel cylinder.

Recently, the autonomous emergency braking (AEB) function has been mounted in more and more vehicles in order to improve the stability of the vehicles. The AEB function indicates that a vehicle recognizes surrounding situations through various sensors and performs braking. When the AEB function is performed, the motor pump is forced to suck brake oil, and supplies amplified hydraulic pressure to the wheel cylinder. At this time, when the motor pump is driven, the brake oil stored in a storage unit may be forcibly introduced to the motor pump through the master cylinder and a brake pipe.

In the related art, since oil is discharged as the motor pump is driven, a braking force may not be stably provided to the vehicle due to pulsation of the discharged oil. Therefore, there is a demand for a device capable of solving the problem.

The related art of the present invention is disclosed in Korean Patent Publication No. 2011-0065845 published on Jun. 16, 2011 and entitled "Braking system of vehicle".

SUMMARY OF THE INVENTION

Embodiments of the present invention are directed to a brake device capable of making better use of a part mounting space and attenuating a pulsation amplitude which occurs when oil is discharged from a pump.

In one embodiment, a brake device for a vehicle may include: a housing block; a plurality of buildup valve mounting parts formed in the housing block and disposed in a first row region; a plurality of reduce valve mounting parts formed in the housing block, and disposed in a second row region formed under the buildup valve mounting parts; a wheel cylinder port formed in the housing block, disposed above the buildup valve mounting parts, and connected to a wheel cylinder; a master cylinder port formed in the housing block, disposed above the buildup valve mounting parts, and connected to a master cylinder; a pump port formed in the housing block, and disposed under the buildup valve mounting parts; and one or more damper units formed in the housing block, and disposed among the buildup valve mounting parts, the wheel cylinder port and the master cylinder port, wherein the master cylinder port, the pump port, the damper unit and the buildup valve mounting part are connected as a flow path.

The buildup valve mounting parts and the reduce valve mounting parts may be disposed on a front surface of the housing block, the master cylinder port and the pump port may be disposed on a rear surface of the housing block, and the wheel cylinder port may be disposed on a top surface of the housing block.

The damper unit may include a first damper disposed between the wheel cylinder port and the buildup valve mounting part, and crossing the housing block in a horizontal direction.

The first damper may be closed in a longitudinal direction.

The first damper may be opened in a longitudinal direction.

The damper unit may include a second damper disposed on the top surface of the housing block.

The brake device may further include an orifice disposed between the damper unit and the wheel cylinder port.

DESCRIPTION OF SPECIFIC EMBODIMENTS

Hereafter, a brake device for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
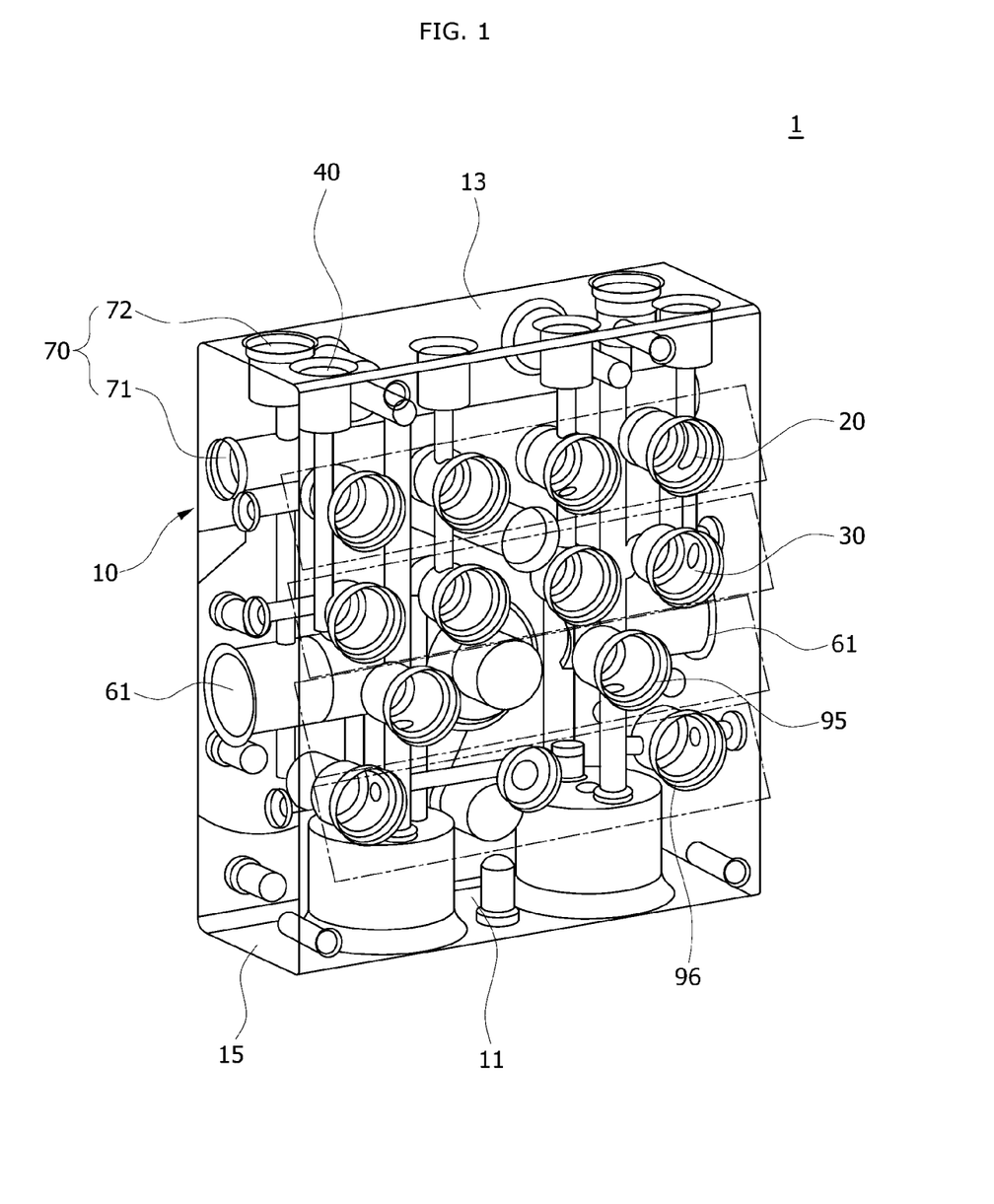
FIG. 1 is a schematic front perspective view of a brake device for a vehicle in accordance with an embodiment of the present invention.
Figure 2:
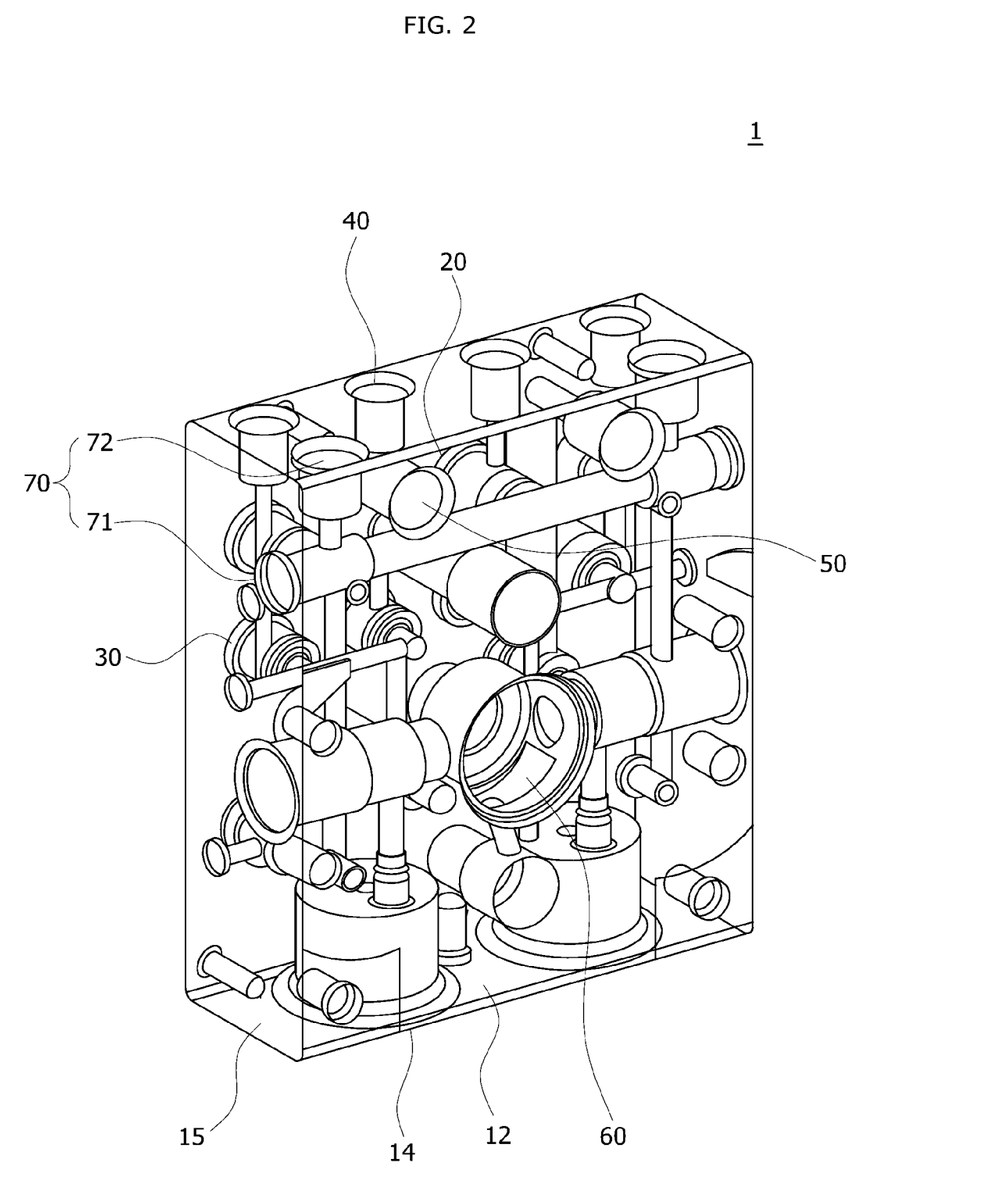
FIG. 2 is a schematic rear perspective view of the brake device for a vehicle in accordance with the embodiment of the present invention.
Figure 3:
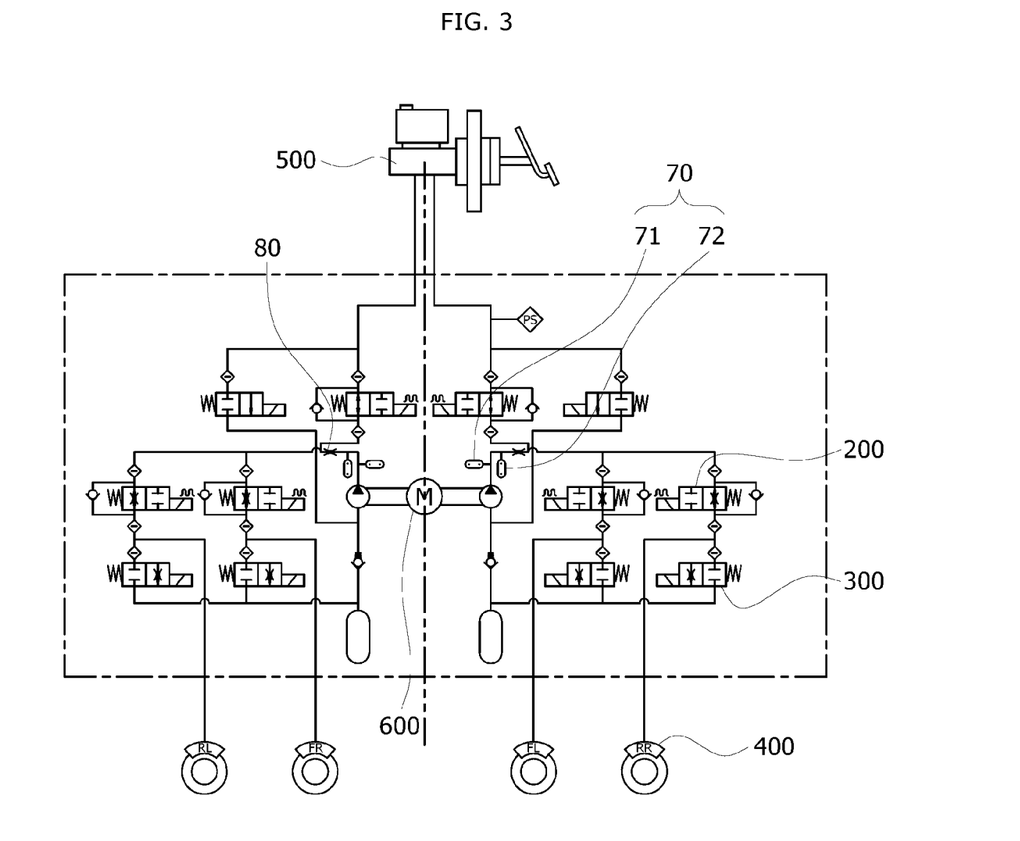
FIG. 3 illustrates a hydraulic circuit including a non-interlocking damper unit in the brake device for a vehicle in accordance with an embodiment of the present invention.
Figure 4:
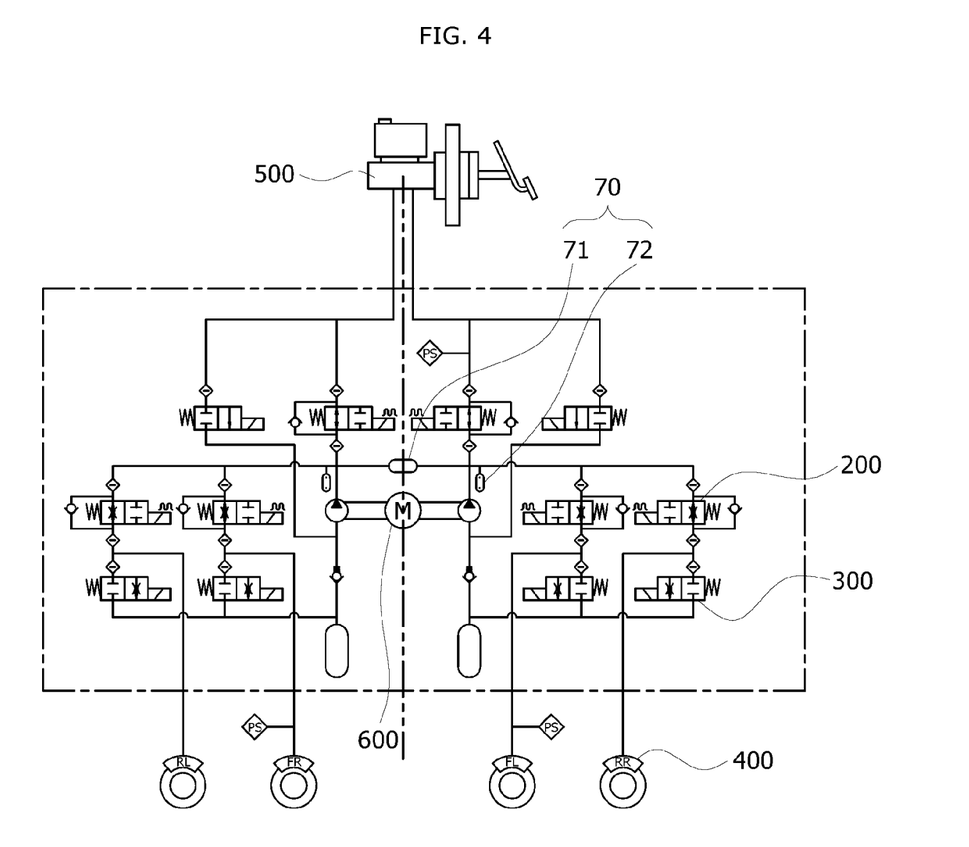
FIG. 4 illustrates a hydraulic circuit including an interlocking damper unit in the brake device for a vehicle in accordance with an embodiment of the present invention.

FIG. 1 is a schematic front perspective view of a brake device for a vehicle in accordance with an embodiment of the present invention, and FIG. 2 is a schematic rear perspective view of the brake device for a vehicle in accordance with the embodiment of the present invention. FIG. 3 illustrates a hydraulic circuit including a non-interlocking damper unit in the brake device for a vehicle in accordance with an embodiment of the present invention, and FIG. 4 illustrates a hydraulic circuit including an interlocking damper unit in the brake device for a vehicle in accordance with an embodiment of the present invention.

Referring to FIGS. 1 to 4, the brake device 1 for a vehicle in accordance with the embodiment of the present invention may include a housing block 10, a plurality of buildup valve mounting parts 20, a plurality of reduce valve mounting parts 30, a plurality of wheel cylinder ports 40, a plurality of master cylinder ports 50, a pump port 60 and one or more damper units 70.

The housing block 10 may be provided to be used in a brake device including an anti-locking and driving dynamic control system. For example, the housing block 10 may be configured as a square block which is manufactured through an extrusion molding method and made of an aluminum alloy subjected to a cutting process. The housing block 10 may include a front surface 11, a rear surface 12, a top surface 13, a bottom surface 14 and a side surface 15.

The plurality of buildup valve mounting parts 20, for example, four buildup valve mounting parts 20 may be formed in the housing block 10, and disposed in a first row region. For example, the first row region may indicate a region which is disposed in the side-to-side direction at the top of the front surface 11 of the housing block 10. Each of the four buildup valve mounting parts 20 may have a buildup valve 200 mounted therein.

The plurality of reduce valve mounting parts 30, for example, four reduce valve mounting parts 30 may be formed in the housing block 10, and disposed in a second row region. For example, the second row region may indicate a region which is disposed on the front surface 11 of the housing block 10 in the side-to-side direction and positioned under the first row region. Each of the four reduce valve mounting parts 30 may have a reduce valve 300 mounted therein.

The plurality of wheel cylinder ports 40 may be formed in the housing block 10, disposed above the buildup valve mounting parts 20, and connected to wheel cylinders 400. For example, the four wheel cylinder ports 40 may be arranged on the top surface 13 of the housing block 10 in the side-to-side direction. The wheel cylinder ports 40 may be connected to the wheel cylinders 400 formed in the respective wheels.

The plurality of master cylinder ports 50 may be formed in the housing block 10, disposed above the buildup valve mounting parts 20, and connected to a master cylinder 500. For example, the two master cylinder ports 50 may be disposed at the top of the rear surface 12 of the housing block 10 so as to be spaced part from each other in the side-to-side direction. The master cylinder ports 50 may be positioned higher than the buildup valve mounting part 20, and oil discharged from the master cylinder 500 may be introduced into the respective master cylinder ports 50.

The pump port 60 may be formed in the housing block 10, and disposed under the buildup valve mounting parts 20. For example, the pump port 60 may be disposed at the center of the rear surface 12 of the housing block 10, and a pump 600 may be mounted in the pump port 60 so as to pump oil. Oil of which the pressure is raised by the pump 600 may be discharged along a flow path 61 connected to both sides of the pump port 60.

The one or more damper units 70 may be formed in the housing block 10, and disposed among the buildup valve mounting part 20, the wheel cylinder port 40 and the master cylinder port 50. The damper unit 70 may serve to reduce pulsation of oil discharged from the pump 600.

The master cylinder port 50, the pump port 60, the damper unit 70 and the buildup valve mounting part 20 may be connected as a flow path through which oil is sequentially transferred. That is, the oil introduced into the master cylinder port 50 may be pressurized while passing through the pump port 60, and the pulsation of the oil may be reduced while passing through the damper unit 70. Then, the oil may be transferred to the buildup valve mounting part 20. The oil having passed through the buildup valve mounting part 20 may reach the wheel cylinder 400 to provide a braking force to the wheel.

The damper unit 70 in accordance with the embodiment of the present invention may include a first damper 71. The first damper 71 may be disposed between the wheel cylinder port 40 and the buildup valve mounting part 20, and formed in a shape to cross the housing block 10 in the horizontal direction. For example, the first damper 71 may have a length in the side-to-side direction of the housing block 10, and a pair of flow paths for guiding the oil discharged from the pump port 60 may be connected to the first damper 71. Both ends of the first damper 71 may be formed on the respective side surfaces 15 of the housing block 10. The length of the first damper 71 may be changed depending on a design condition and a pulsation reduction rate.

The first damper 71 may be closed in the longitudinal direction (refer to FIG. 3). In other words, the first damper 71 may have a length in the side-to-side direction, and include a partition wall formed therein, such that inner portions divided by the partition wall are not interlocked with each other. In addition, the first damper 71 may be formed as a pair of first dampers spaced apart from each other, and connected to the pump port 60.

The first damper 71 may be opened in the longitudinal direction (refer to FIG. 4). That is, the first damper 71 may have a length in the side-to-side direction, and include no partition wall such that inner portions can be interlocked with each other.

The damper unit 70 in accordance with the embodiment of the present invention may include a second damper 72. The second damper 72 may be formed on the top surface 13 of the housing block 10. For example, the second damper 72 may be formed in a pair of flow paths for guiding the oil which diverges and discharges from the pump port 60. One or more of the first and second dampers 71 and 72 may be disposed as the damper unit 70, and the number of the damper units 70 may be changed depending on a design condition and a pulsation reduction rate.

The brake device 1 for a vehicle in accordance with the embodiment of the present invention may further include an orifice 80. The orifice 80 may be disposed between the damper unit 70 and the wheel cylinder port 40. More specifically, the orifice 80 may be formed in a flow path which connects the exit of the damper unit 70 to the wheel cylinder port 40, and serve to reduce pulsation.

The hydraulic pressure flow of the brake device for a vehicle in accordance with the embodiment of the present invention will be schematically described as follows.

When the first damper 71, the second damper 72 and the orifice 80 are formed and the first damper 71 is a non-interlocking damper (refer to FIG. 3), pulsation of oil discharged from the master cylinder 500 or oil discharged from the pump 600 may be reduced while the oil sequentially passes through the first damper 71, the second damper 72 and the orifice 80. Then, the oil may reach the wheel cylinder 400 through the wheel cylinder port 40 to provide a braking force.

Furthermore, when the first damper 71 and the second damper 72 are formed and the first damper 71 is an interlocking damper (refer to FIG. 4), pulsation of oil discharged from the master cylinder 500 or oil discharged from the pump 600 may be reduced while the oil sequentially passes through the first damper 71 and the second damper 72. Then, the oil may reach the wheel cylinder 400 through the wheel cylinder port 40 to provide a braking force.

Figure 5A:
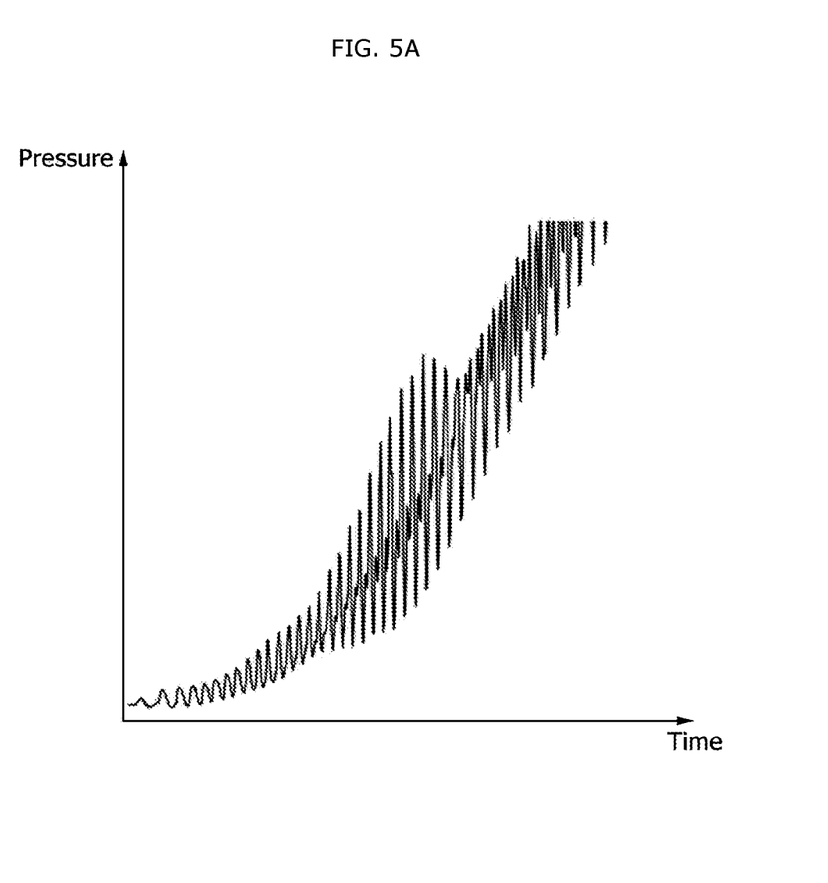
FIGS. 5A and 5B are graphs schematically illustrating a pulsation amplitude of the brake device for a vehicle in accordance with the embodiment of the present invention.
Figure 5B:
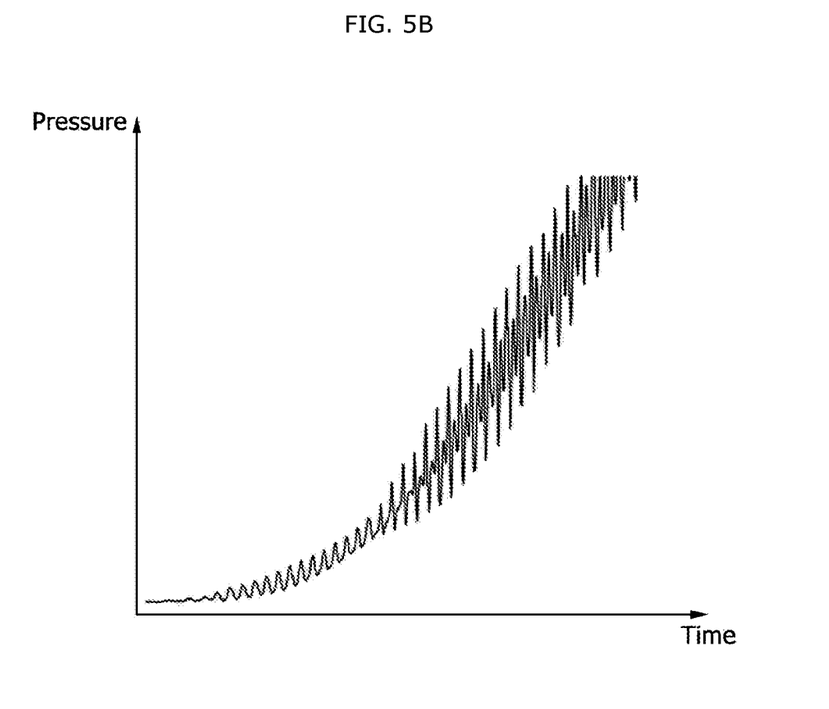

FIGS. 5A and 5B are graphs schematically illustrating a pulsation amplitude of the brake device for a vehicle in accordance with the embodiment of the present invention. FIGS. 5A and 5B shows that, when the dampers are applied (refer to FIG. 5B), the pulsation amplitude is reduced more significantly than when the dampers are not applied (refer to FIG. 5A).

The brake device 1 for a vehicle in accordance with the embodiment of the present invention may include one or more damper units 70 to reduce the pulsation amplitude of the oil discharged from the pump 600.

The brake device 1 for a vehicle in accordance with the embodiment of the present invention may additionally include the orifice 80 formed in the flow path formed between the damper unit 70 and the wheel cylinder port 40, thereby reducing the pulsation amplitude of the oil discharged from the pump 600.

In the brake device 1 for a vehicle in accordance with the embodiment of the present invention, one or more damper units 70 may be disposed between the wheel cylinder port 40 and the master cylinder port 50. Thus, the utilization of the part mounting space can be improved to reduce the size and weight of a product.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A brake device for a vehicle, comprising:
    a housing block having a top surface, a bottom surface opposite to the top surface, a first side surface adjacent to the top surface and the bottom surface, and a second side surface opposite to the first side surface;
    a plurality of buildup valve mounting parts disposed in the housing block in a first row;
    a plurality of reduce valve mounting parts disposed in the housing block in a second row, wherein the second row is farther away from the top surface than the first row;
    a wheel cylinder port disposed on the top surface of the housing block and connected to a wheel cylinder;
    a master cylinder port disposed between the top surface of the housing block and the plurality of buildup valve mounting parts and connected to a master cylinder;
    a pump port disposed between the bottom surface of the housing block and the plurality of buildup valve mounting parts; and
    a first damper disposed between the top surface of the housing block and the plurality of buildup valve mounting parts, wherein the first damper extends from the first side surface of the housing block to the second side surface of the housing block along a longitudinal direction that is parallel to the first row in which the plurality of buildup valve mounting parts are disposed,
    wherein the master cylinder port, the pump port, the first damper and the plurality of buildup valve mounting parts are connected as a flow path.

2. The brake device of claim 1, further comprising a second damper disposed on the top surface of the housing block.

3. The brake device of claim 2, further comprising a third damper disposed on the top surface of the housing block, wherein the second damper and the third damper are separately connected to the pump port.

4. The brake device of claim 1, wherein the plurality of buildup valve mounting parts and the plurality of reduce valve mounting parts are disposed on a front surface of the housing block that is adjacent to the top surface, the bottom surface, the first side surface, and the second side surface of the housing block,
    the master cylinder port and the pump port are disposed on a rear surface of the housing block that is opposite to the front surface, and
    the wheel cylinder port is disposed on the top surface of the housing block.

5. The brake device of claim 4, wherein the first damper is disposed between the wheel cylinder port and the plurality of buildup valve mounting parts.

6. The brake device of claim 5, wherein the first damper includes an internal partition wall that divides an inner space of the first damper into two separate inner portions arranged along the longitudinal direction.

7. The brake device of claim 6, wherein the two separate inner portions of the first damper are separately connected to the pump port.

8. The brake device of claim 5, wherein the first damper is free of any internal partition wall that would divide an inner space of the first damper into separate inner portions arranged along the longitudinal direction.

9. The brake device of claim 2, wherein the flow path comprises the first damper, the second damper, and the wheel cylinder port in that order.

10. The brake device of claim 9, further comprising an orifice, the flow path further comprising the orifice between the second damper and the wheel cylinder port.

11. The brake device of claim 1, further comprising an orifice disposed between the first damper and the wheel cylinder port.

12. The brake device of claim 1, wherein the first damper is disposed between the wheel cylinder port and the master cylinder port.

13. The brake device of claim 1, wherein the flow path comprises the master cylinder port, the pump port, the first damper, and the plurality of buildup valve mounting parts in that order.

14. The brake device of claim 13, wherein the flow path further comprises the wheel cylinder port after the plurality of buildup valve mounting parts.

* * * * *